Sept. 10, 1940.　　　A. G. ROTH　　　2,214,261
SEALING DEVICE
Filed Aug. 25, 1938
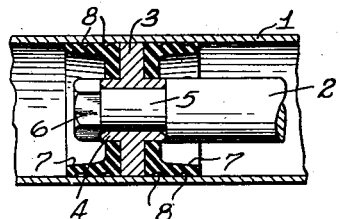 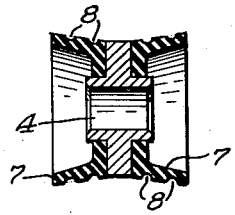
Fig. 1.　　　Fig. 2.
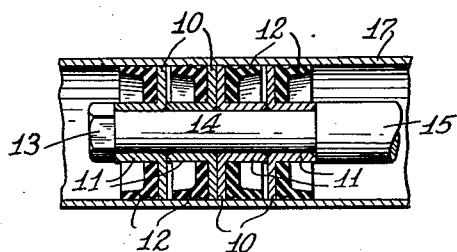 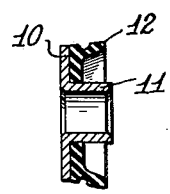
Fig. 3.　　　Fig. 4.
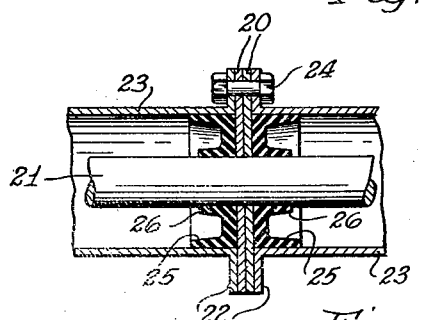 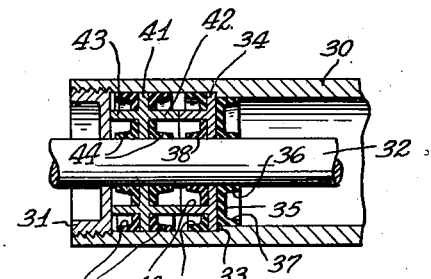
Fig. 5.　　　Fig. 6.
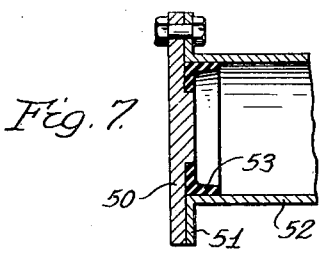 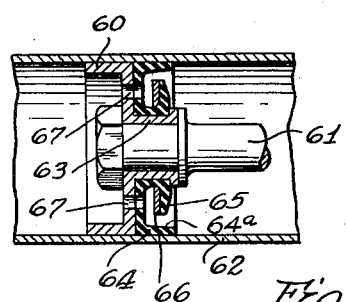
Fig. 7.　　　Fig. 8.
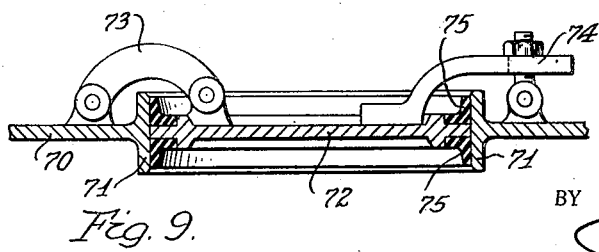
Fig. 9.
INVENTOR.
Adam G. Roth
BY
　　Windsor Davis
ATTORNEY.

Patented Sept. 10, 1940

2,214,261

UNITED STATES PATENT OFFICE 2,214,261

SEALING DEVICE

Adam G. Roth, Mineola, N. Y.

Application August 25, 1938, Serial No. 226,781

6 Claims. (Cl. 286—26)

This invention relates to hydraulic seals and has for its primary object to provide a lip seal formed of resiliently flexible material for use in conjunction with either stationary members in place of gaskets, or reciprocating members for transmitting loads or applying pressure on liquids.

Another object is to provide a seal composed of resiliently flexible organic material surface bonded to a metal member, the latter functioning as a reinforcement providing the mechanical strength necessary to withstand comparatively high fluid pressures. More specifically, the present seal comprises a rubber lip formation vulcanized to a rigid element.

Another object is to provide a seal of the character above defined which is deformed by contact with the member which it seals, whereby resilient pressure is induced by such deformation to produce an effective sealing action.

Another object is to provide a seal composed of a resiliently flexible lip whose advance edge is resiliently pressed against the member which it seals as a result of the inherent resiliency of the lip, and also embodying a circumferential groove providing a supplemental sealing action.

Another object is to provide a seal composed of resiliently flexible material having a metal hub member whereby it may be attached to a rod for service as a piston, the piston thus provided being adapted to be compressed by contact with the wall of the cylinder in which it operates. The metal hub member functions to prevent collapse of the piston in the presence of high pressures, and relieves the piston of localized pressure zones such as ordinarily be present adjacent the connection with its actuating rod.

In the accompanying drawing:

Fig. 1 is a section illustrating the present seal in conjunction with a piston;

Fig. 2 is a detail section of the piston;

Fig. 3 is a section illustrating a piston composed of a plurality of individual sealing units;

Fig. 4 is a detail section relating to Fig. 3;

Fig. 5 is a section illustrating the applicability of the present seal to a stationary element;

Fig. 6 is a section illustrating a multiple arrangement of seals in conjunction with a stationary element;

Fig. 7 is a section illustrating the seal applied to an end closure;

Fig. 8 is a section illustrating the seal in conjunction with a piston having valve ports, and Fig. 9 is a section illustrating the use of the seal in conjunction with a pivoted closure.

Referring to Figs. 1 and 2, a cylindrical body 1 had a rod 2 therein reciprocal relative thereto. A disc 3, having a hub formation 4 is secured on the reduced end 5 of the rod 2 by a nut 6. Annular sealing lips, formed of rubber or material having the characteristics of rubber, are surface bonded to opposite faces of the disc 3. The sealing lips, in the case of rubber, are vulcanized to the disc. The essence is that the region adjacent the outer periphery be surface bonded.

As is more clearly shown in Fig. 2, the lip formations are normally flared to a diameter greater than the internal diameter of the cylindrical body 1, and when inserted in the cylindrical body they are compressed. Compression of the sealing lips induces resilient pressure providing effective sealing contact with the cylinder wall. This sealing action is supplemented by providing circumferential grooves 8 in the outer periphery of the lips, these grooves acting also as a means to carry lubricant between body 1 and sealing member.

The sealing lips 7 have comparatively sharp front edges and their smallest diameter portions are equal to the diameter of the disc 3, and the entire area of the base portion of each lip is surface bonded to the disc. As the disc 3 is moved in one direction, the entire sealing lip is subjected to compression in the presence of fluid pressure, whereas movement of the disc in the other direction subjects the seal to tension because of friction with the cylinder wall. Due to the lip being bonded to the disc at its outermost circumference, said lip acts as additional piston bearing surface and provides the resilient force against the cylinder wall of the lip. The lip edge is preferably of reduced cross-section and is also preferably tapered although it is not particularly detrimental to have it squared. The essential requirement is that it not be rounded or reversely tapered.

In Figs. 3 and 4 a disc-like metal element 10 having a central tubular formation 11 has a flared sealing lip 12 surface bonded thereto. A plurality of discs 10, with their sealing lips 12, are assembled and clamped by a nut 13 upon the reduced end 14 of a rod 15, the tubular portions 11 of the several elements contacting one with another whereby they receive the clamping pressure for sealing along the reduced end 14. In Fig. 3 there is illustrated a group of four sealing elements in which two are oppositely disposed with respect to the other two. The several sealing lips 12 each have a circumferential sealing groove 16, and are maintained in a compressed condition by contact with the wall of the cylinder 17.

Fig. 5 shows a pair of discs 20 each having an axial opening through which a reciprocal or rotatable shaft 21 extends. The discs 20 have their peripheral portions interposed between flanges 22 on cylindrical members 23, the flanges being secured together by a plurality of bolts, such as the one shown at 24. On the face of each disc 20 is a double-lipped seal, one lip 25 contacting the adjacent cylindrical member 23 and the other lip 26 contacting the shaft 21. As in the cases above described, the lips 25 and 26 are formed in such manner that they are deformed by contact with the cylinders and shaft, respectively, and such deformation induces sufficient pressure to provide an effective seal between these lips and the cylinder wall.

Fig. 6 illustrates two double-lipped seals adapted to seal a housing and a reciprocating or rotating shaft in two directions. The housing 30 has a metal plug 31 screw-threaded in the end thereof through which the shaft 32 extends. Within the housing 30 is a shoulder 33 and a metal disc 34 contacts this shoulder. On one face of the disc 34 is surface bonded a seal 35 having a lip 36 contacting the shaft and a lip 37 contacting the inner surface of the housing 30. On the other face of the disc 34 is a lip seal 38 contacting the shaft and a lip seal 39 contacting the housing, the two lips 38 and 39 being separated by an annular spacer formation 40 formed integral with the disc 34.

A second disc 41 has opposed annular spacer formations 42 and 43, the spacer 42 being held against the spacer 40 by contact of the plug 31 with the other spacer 43. On opposite sides of the disc 41 are sealing lips 44 which contact the shaft 32, and sealing lips 45 which contact the housing 30. All of the sealing lips are formed whereby they are deformed by contact with the shaft or housing, as the case may be, whereby an effective sealing pressure is constantly present.

Fig. 7 illustrates a seal in conjunction with the end closure of a high pressure pipe or housing. In this case a disc 50 is bolted to the end flange 51 of a pipe 52. Bonded to the inner face of the disc is an annular sealing lip 53. The sealing lip 53 is proportioned whereby it is deformed by insertion in the pipe 52, and deformation thereof induces sufficient pressure to effect a seal, while bolts retaining disc 50 are merely required to take the internal pressure against the area within the circumference of the sealing lip.

In Fig. 8 there is illustrated a piston 60 mounted upon a rod 61 within a cylinder 62. To the face of the piston 60, and also to the hub portion 63 thereof, is surface bonded a seal 64. The seal has a lip formation 64a which is deformed by contact with the wall of the cylinder 62. The extremity of the hub contacting portion of the seal 64 is flanged at 65, and an annular metal member 66 is surface bonded to this flange. In line with the annular member the piston and seal are provided with ports 67.

With this construction, fluid may pass through the ports 67 as the piston is moved toward the left hand side of Fig. 8, whereas upon movement in the opposite direction the flanged portion 65, which deflects readily, permits the fluid to move the annular member 66 to a position covering the ports 67, due to the inertia of the fluid.

Fig. 9 illustrates the sealing of a closure, such as a door for preventing the escape of liquids from high pressure vessels, the purpose being to avoid the necessity of using a large number of closely spaced bolts to secure the door in place and effect a seal, as in the case of flat seating gaskets. The opening to be sealed is provided in the wall 70 and is surrounded by an annular flange 71. The closure 72 is supported by a link type hinge 73 whereby it may be swung into or out of the opening, and releasable holding means 74 is provided for holding the closure in the opening. On opposite sides of the closure are surface bonded annular sealing lips 75 which are normally flared, as above described, whereby they are deformed by contact with the flange 71, to thereby induce sufficient pressure to effect a seal.

What I claim is:

1. In a device of the character described, a circular metal member having an axial opening, a pair of concentric annular formations formed of resiliently flexible material surface bonded to said metal member, the outer of said annular formations increasing in diameter outwardly and the inner decreasing in diameter outwardly, the outer annular formation being adapted to be deformed by insertion thereof within a member having a diameter substantially corresponding to the metal member, the inner annular formation being adapted to be deformed by insertion of a shaft having a diameter substantially corresponding to the diameter of said axial opening, and a concentric annular spacer member extending axially between the inner and outer annular formations an axial distance greater than the axial length of said annular formations.

2. In a device of the character described, a circular metal member having an axial opening, axially extended spacer formations on said metal member, a pair of concentric annular formations formed of resiliently flexible material surface bonded to said metal member, the outer of said annular formations increasing in diameter outwardly and the inner decreasing in diameter outwardly, the outer annular formation being adapted to be deformed by insertion thereof within a member having a diameter substantially corresponding to the metal member, and the inner annular formation being adapted to be deformed by insertion of a shaft having a diameter substantially corresponding to the diameter of said axial opening, and both of said annular formations being of an axial length less than the length of said axially extended spacer formations.

3. In a device of the character described, a circular metal member having an axial opening, axially extended circular spacer formations on each of the opposite sides of said metal member, a pair of concentric annular formations formed of resiliently flexible material surface bonded to each side of said metal member, the outer of said annular formations increasing and the inner annular formations decreasing in diameter as they extend outwardly from the metal member, the outer annular formations being adapted to be deformed by insertion thereof within a cylindrical member having a diameter substantially corresponding to the diameter of the metal member, the inner annular formations being adapted to be deformed by insertion therein of a shaft having a diameter substantially corresponding to the diameter of said axial opening, and said circular spacer formations having an axial length greater than the axial length of the annular formations.

4. A sealing assembly for use with a cylindrical member having an internal shoulder and a shaft concentrically disposed therein, said assembly comprising a metal member adapted to seat against said shoulder and having an axial opening through which said shaft is adapted to extend, said metal member having a circular spacer formation extending axially thereof, outer and inner annular formations formed of resiliently flexible material secured to said metal member and adapted to engage the cylindrical member and the shaft respectively, said spacer formation being of axial length greater than the axial length of the annular formations, a second metal member having an axial opening and a circular axially extending spacer formation engaging the spacer formation of the first metal member, and outer and inner annular formations on said second metal member extending axially in the direction of the spacer formation thereon and adapted to engage the cylindrical member and shaft respectively, said second named metal member having means thereon adapted to be engaged by a clamping member associated with the cylindrical member for pressing the two spacer formations together and the first metal member against the shoulder.

5. A sealing assembly for use with a cylindrical member having an internal shoulder and a shaft concentrically disposed therein, said assembly comprising a metal member adapted to seat against said shoulder and having an axial opening through which said shaft is adapted to extend, said metal member having a circular spacer formation extending axially thereof, outer and inner annular formations formed of resiliently flexible material secured to said metal member and adapted to engage the cylindrical member and the shaft respectively, said spacer formation being of axial length greater than the axial length of the annular formations, a second metal member having an axial opening and circular axially extending spacer formations on opposite sides thereof, a pair of concentric outer and inner annular formations formed of resiliently flexible material secured to each side of said second metal member and adapted to engage the cylindrical member and shaft respectively, said annular formations on opposite sides of the second metal member being of less axial length than the axial length of the spacer formations thereon, one of said spacer formations being adapted to be engaged by a pressure applying member associated with the cylindrical member for pressing its other spacer member into contact with the spacer formation of the first metal member and to press the first metal member into contact with said shoulder.

6. In combination, a cylindrical member having an internal shoulder, a shaft concentric with said member, a metal member engaging said shoulder and having an axial opening through which said shaft extends, outer and inner annular formations secured to said metal member on the side opposite said shoulder and adapted to engage the cylindrical member and shaft respectively, a circular spacer formation extending axially between the annular formations a distance greater than the axial length of said annular formations, a second metal member having an axial opening for the reception of said shaft, outer and inner annular formations secured on each side of said second metal member and adapted to engage the cylindrical member and shaft respectively, circular spacer members on opposite sides of said second member extending axially between respective outer and inner annular formations a distance greater than the axial length of the annular formations, and a clamping member engaging one spacer formation on the second named metal member to press its other spacer formation into engagement with the spacer formation on the first metal member and to press the latter into engagement with said shoulder.

ADAM G. ROTH.